United States Patent [19]

Nguyen et al.

[11] Patent Number: 5,404,425
[45] Date of Patent: Apr. 4, 1995

[54] PEN OPERABILITY CHECKING SYSTEM FOR VECTOR PLOTTERS

[75] Inventors: Patrick Nguyen, Diamond Bar; Charles H. Morris, II, Brea; John M. Bertalan, Tustin, all of Calif.

[73] Assignee: CalComp Inc., Anaheim, Calif.

[21] Appl. No.: 878,533

[22] Filed: May 5, 1992

[51] Int. Cl.⁶ .................................................. G05B 1/00
[52] U.S. Cl. ................................... 395/103; 346/139 R
[58] Field of Search ............................. 395/103–105, 395/113; 346/139 R, 29; 358/405–406; 356/429, 430, 431

[56] References Cited

U.S. PATENT DOCUMENTS

| 5,170,047 | 12/1992 | Beauchamp et al. | 250/202 |
| 5,261,038 | 9/1993 | Adroher et al. | 395/103 |
| 5,262,797 | 9/1993 | Boeller et al. | 395/103 |

Primary Examiner—Mark R. Powell
Assistant Examiner—Tracy M. Legree
Attorney, Agent, or Firm—William F. Porter, Jr.; Donald A. Streck

[57] ABSTRACT

Apparatus and an associated method for ascertaining the operational status of a pen in a vector plotter in which a pen is moved into contact with a paper web at a test location, the pen is moved relative to the web and an optical detector is used to determine whether or not the pen is drawing a line on the web. The web is moved from a supply roll to a take-up roll to move the test area on the web to an optical testing location. The absence of a line after a pre-determined period of web movement time signals the inoperative status of the pen and the detection of a line by the pen within that pre-determined period of movement time signals that the pen is operative. Quality and proper line width of the line can also be determined.

22 Claims, 2 Drawing Sheets

PEN OPERABILITY CHECKING SYSTEM FOR VECTOR PLOTTERS

BACKGROUND OF THE INVENTION

This invention relates to a system for ascertaining the operational status of a pen in a vector plotter prior to a plotting operation and/or during intermediate stages of such an operation.

A significant amount of operational time of vector plotters is wasted as a result of attempting plots with inoperative pens either due to failure of the pen to be primed or clogging or other unsatisfactory conditions of the pens. Various proposals have been made for alleviating this problem including arrangements for priming a pen prior to a plotting operation (for example, U.S. Pat. No. 2,977,180 to Zenner and U.S. Pat. No. 4,782,349 to Sieber et al); storing the pen with the pen tip in a constantly wetted condition between plotting operations (for example, U.S. Pat. No. 3,613,248 to McInnis and U.S. Pat. No. 4,628,326 to Fukumura et al); removing excess ink, ink blobs, and clogs by the use of a felt or brush prior to a plotting operation (for example, U.S. Pat. No. 3,730,975 to Kono et al); and, providing optical means for detecting the failure of a pen to produce a desired line during a plotting operation and upon such detection causing the software to repeat the omitted portion of the line to correct the omission (for example, U.S. Pat. No. 4,335,674 to Hevenor et al). These proposed arrangements are unsatisfactory in that they either fail to confirm that the pen is in fact working or, in the case of Hevenor, only the failure of pen to produce a line during an actual plotting operation is detected with the consequent need to repeat portions of software controlling the portion of the plot where failure occurred. Additionally, in this latter case, the system for detecting failure of a pen during the actual plotting operation is complex and expensive.

Wherefore, it is an object of the present invention to provide a simple, economical system for ascertaining the operability of a pen immediately prior to or after a plotting operation thereby to overcome the shortcomings of the prior art and substantially reduce the waste and operational time lost in vector plotters as a result in attempting plotting operations with pens that are inoperative or operating unsatisfactorily.

Other objects and benefits of the invention will become apparent from the detailed description which follows hereinafter when taken in conjunction with the drawing figures which accompany it.

SUMMARY OF THE INVENTION

The foregoing object has been attained by the apparatus of the present invention for checking the operational status of a pen operationally held in a vector plotter and employed in the vector plotter for plotting lines on a plotting medium moving over a platen at a plotting station comprising, a web separate from the plotting medium and displaced from the plotting station; a motor connected to move the web between a drawing station and a sensing station; means for moving a pen to be tested to the drawing station and for placing the pen in drawing contact with the web; means for producing relative movement between the pen and the web; first logic means for activating the motor to move the web from the drawing station to the sensing station; sensing means at the sensing station for sensing the presence of a line on the web; and, second logic means for outputting a pen operative signal if a line is detected on the web by the sensing means at the sensing station and for outputting a pen inoperative signal if a line is not detected on the web by the sensing means at the sensing station.

In the preferred embodiment, the first logic means and the second logic means cooperate to provide means for starting the motor to move the web from the drawing station to the sensing station, for stopping the motor and outputting a pen operative signal as soon as a line is detected on the web by the sensing means, and for stopping the motor and outputting a pen inoperative signal if a line is not detected on the web by the sensing means within a pre-established time after the motor is started.

Also in the preferred embodiment, the web is connected between a supply roller and a take-up roller and the motor is connected to drive the take-up roller and pull the web from the supply roller. Also, the preferred sensing means is an optical sensor. With the optical sensor, the sensing means, the first logic means, and the second logic means can cooperate to provide an indication of detected line quality as produced by the pen on the web or to provide an indication of detected line width as produced by the pen on the web.

The preferred means for producing relative movement between the pen and the web comprises means for moving the pen over the web. Preferably, the means for moving the pen over the web moves the pen laterally across the web and the drawing station comprises a lateral extension of the platen.

BRIEF DESCRIPTION OF THE DRAWINGS

The present invention and selected elements of the prior art will now be described, by way of example, with reference to the accompanying drawings, in which.

DESCRIPTION OF THE PREFERRED EMBODIMENT

Figure 2:
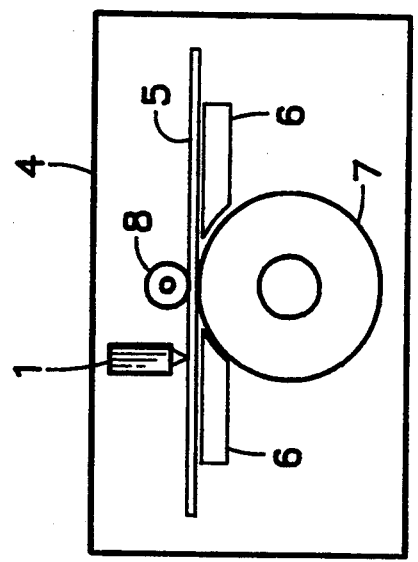
FIG. 2 is a diagrammatic fragmentary end elevation of a vector plotter of the prior art similar to that of FIG. 1.
Figure 1:
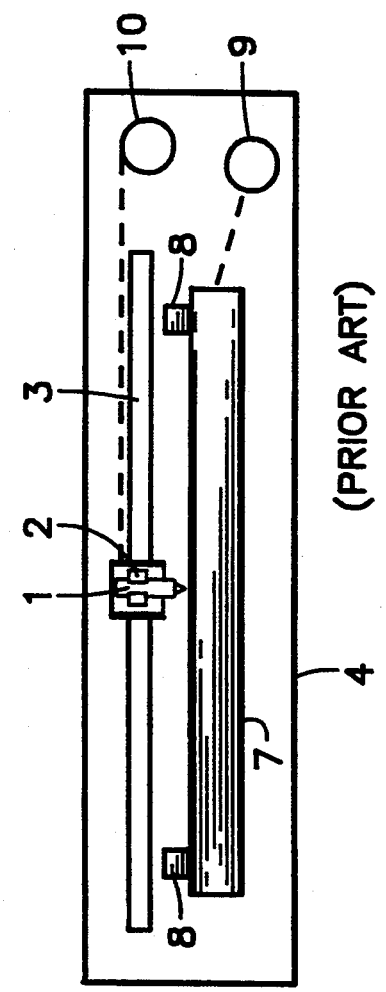
FIG. 1 is a diagrammatic fragmentary representation of the basic elements of a vector plotter of the prior art.

With reference to the prior art illustrated in FIGS. 1 and 2, a vector plotter 4 includes a pen 1 supported on a carriage for sliding motion along a guide 3 of the vector plotter 4 to produce vector plotting on a plotting medium 5 which can be moved normal to the length of the guide 3 over a platen 6 by a main roller 7 operating in conjunction with pinch rollers 8 and driven by a motor 9. Movement of the carriage along the guide 3 is by means of a further motor 10.

The system of the present invention will now be described with reference to FIGS. 3 and 4. Paper drive roller 7 is driven, for example, by way of a belt drive 11 by a motor 9. A plotting medium 5 is moved over platen 6 by the drive roller 7 in cooperation with pinch roller 8 with pen 1 in contact with the plotting medium during the drawing of lines. At the end 1 of the drive roller 7, remote from the area of the plotter which accommodates the plotting medium, is located the pen operability checking system 13 of the present invention which comprises a supply roll 14 of paper web or tape which is arranged to pass over an extended portion of the platen 6 to a take-up roll 15. The supply roll 14 is frictionally braked to apply tension to the paper web 16 as it passes over the platen 6 to the take-up roll 15. The take-up roll 15 is driven by a motor 17 under the control of a logic circuit 18 which is responsive to an optical device 19 of a kind well known in the art disposed over the web 16 between the platen 6 and the take-up roll 15 to detect the presence of a line produced by pen 1 when it is brought into contact with the paper web after movement of the carriage 2 in the direction of arrow 20 from the normal plotting area.

Figure 3:
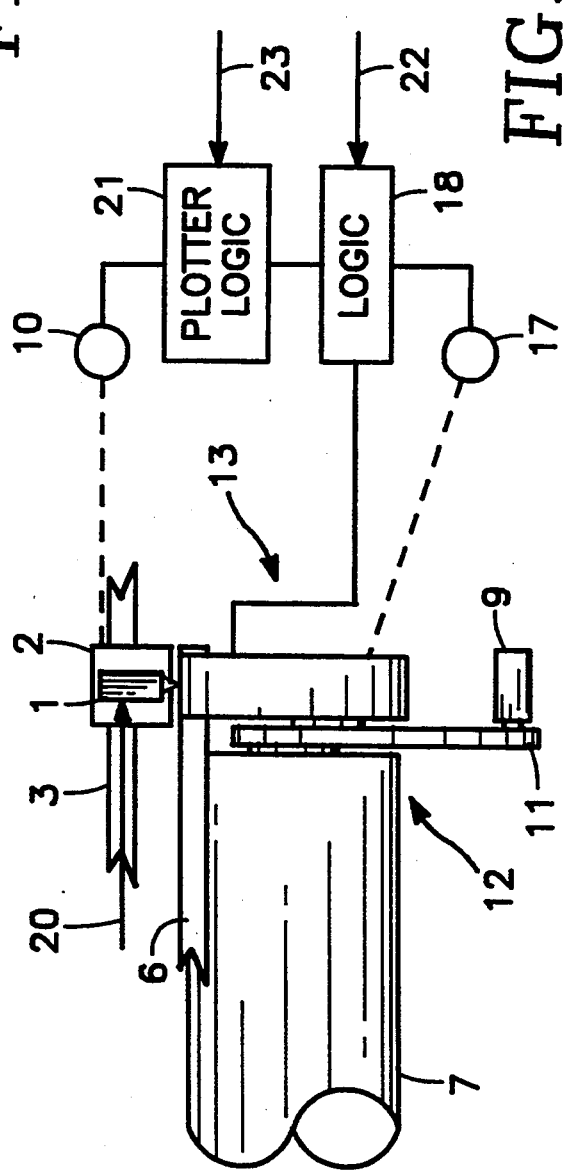
FIG. 3 is a diagrammatic elevation of the pen operability checking system of the present invention; and, FIG. 4 is a diagrammatic end elevation of the system illustrated in FIG. 3.
Figure 4:
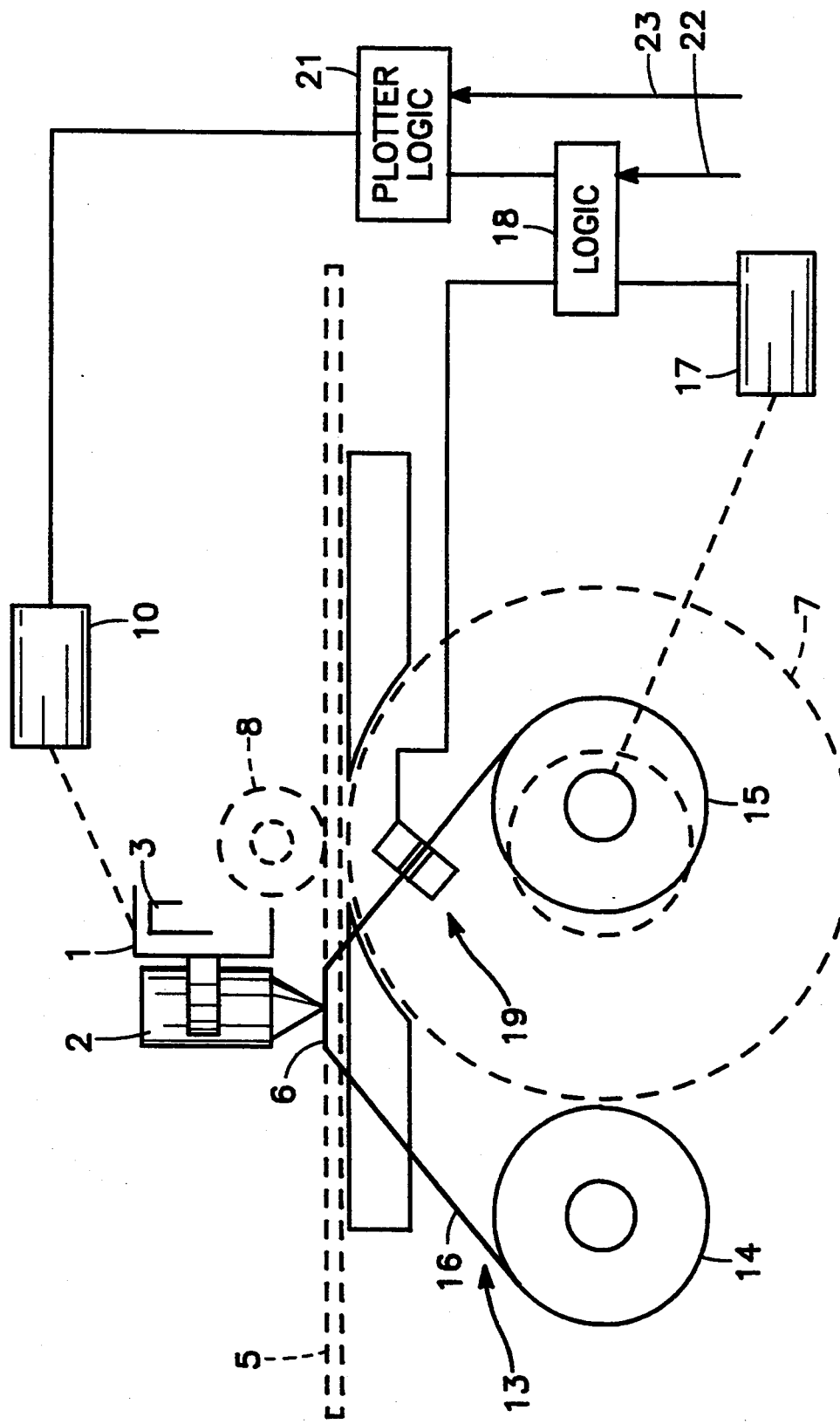

The system operates as follows:

Prior to a plotting operation (or during intermediate stages of that operation as necessary), particularly when a new pen is to be placed into use or when a pen has been inactive for a period of time, the carriage 2 carrying the pen 1 is moved by the motor 10 into the test or checking position shown in FIG. 3 in which the pen is located over the paper web 16. The pen is then lowered into contact with the web 16 and the motor 10 is activated by the logic circuit 21, in response to an input 23 signalling the lowered presence of a pen in the test location, to move the pen 1 relative to the web 16 for a given distance. The pen 1 is then lifted from the platen 6. A length of the web 16 as used in the test is then moved from the supply roll 14 to the take-up roll 15. If the pen 1 was operative, a line is produced on the web 16. That line is detected by the optical detector 19, which then provides an output signalling this detection to the logic circuit 18. Once the line is detected, the logic circuit 18 responds by deactivating the motor 17 to prevent further movement of the paper web 16. Additionally, the logic circuit 18 provides an output signalling the operative status of the pen to the vector plotter logic 21 which, in turn, causes the pen to be moved to the normal plotting area in preparation for a plotting operation.

If the optical sensor fails to detect a line within a predetermined operating time of the motor 17, which translates into a desired number of inches of movement of the web 16, the logic circuit 18 deactivates the motor 17 and indicates to the vector plotter logic 21 that the pen is inoperative in order that the plotter logic 21 may indicate the need for a replacement pen or automatically obtain a replacement pen from a suitable storage area, for example a pen carousel.

Preferably, the pen 1 is moved laterally across the web 16. This has a number of advantages. First, the normal carriage and pen driving mechanisms can be employed. Second, a minimum amount of the web 16 is employed with each test. Third, the web 16 does not have to be moved to the end of a test line before being "reset" to test the next pen.

Thus, the system of the present invention eliminates a substantial portion of downtime resulting from inoperative pens by virtue of its ability to ascertain the operative status of the pen immediately prior to a plotting operation.

It will be appreciated that in dependence of the sophistication of the optical device 19 and the logic 18, the system of the present invention can be used not only to determine whether a pen is operating or not operating; but also, to determine the quality of operation of the pen. For example, variations in line width, line density, or intermittent operation could be detected by the optical device 19 and the logic 18 employing techniques known to those skilled in the art and used to determine whether pen being tested should be rejected or not. By testing line width, for example, the selection of a pen of the proper line width to be employed in drawing a next series of line vectors by the plotter can be verified so that the placement of an improper pen in a carousel position will not result in a complete drawing containing lines of improper width.

Wherefore, having thus described the present invention, what is claimed is:

1. Apparatus for checking the operational status of a pen operationally held in a vector plotter and employed in the vector plotter for plotting lines on a plotting medium moving over a platen at a plotting station comprising:
   a) a web separate from the plotting medium and displaced from the plotting station;
   b) a motor connected to move said web between a drawing station and a sensing station;
   c) means for moving a pen to be tested to said drawing station and for placing said pen in drawing contact with said web;
   d) means for producing relative movement between said pen and said web;
   e) first logic means for activating said motor to move said web from said drawing station to said sensing station;
   f) sensing means at said sensing station for sensing the presence of a line on said web; and,
   g) second logic means for outputting a pen operative signal if a line is detected on said web by said sensing means at said sensing station and for outputting a pen inoperative signal if a line is not detected on said web by said sensing means at said sensing station.

2. The apparatus for checking the operational status of a pen operationally held in a vector plotter of claim 1 wherein:
   said first logic means and said second logic means cooperate to provide means for starting said motor to move said web from said drawing station to said sensing station, for stopping said motor and outputting a pen operative signal as soon as a line is detected on said web by said sensing means, and for stopping said motor and outputting a pen inoperative signal if a line is not detected on said web by said sensing means within a pre-established time after said motor is started.

3. The apparatus for checking the operational status of a pen operationally held in a vector plotter of claim 1 wherein:
   a) said web is connected between a supply roller and a take-up roller; and,
   b) said motor is connected to drive said take-up roller and pull said web from said supply roller.

4. The apparatus for checking the operational status of a pen operationally held in a vector plotter of claim 1 wherein:
   said sensing means is an optical sensor.

5. The apparatus for checking the operational status of a pen operationally held in a vector plotter of claim 4 wherein:
   said sensing means, said first logic means, and said second logic means cooperate to provide an indication of detected line quality as produced by said pen on said web.

6. The apparatus for checking the operational status of a pen operationally held in a vector plotter of claim 4 wherein:

said sensing means, said first logic means, and said second logic means cooperate to provide an indication of detected line width as produced by said pen on said web.

7. The apparatus for checking the operational status of a pen operationally held in a vector plotter of claim 1 wherein:

said means for producing relative movement between said pen and said web comprises means for moving said pen over said web.

8. The apparatus for checking the operational status of a pen operationally held in a vector plotter of claim 7 wherein:

said means for moving said pen over said web moves said pen laterally across said web.

9. The apparatus for checking the operational status of a pen operationally held in a vector plotter of claim 1 wherein:

said drawing station comprises a lateral extension of the platen.

10. In a vector plotter employing a pen for plotting lines on a plotting medium moving over a platen at a plotting station, a method for checking the operational status of a pen operationally held by the vector plotter comprising the steps of:

a) prior to pen testing,
 a1) providing a web separate from the plotting medium and displaced from the plotting station, and
 a2) connecting a motor to move the web between a drawing station and a sensing station; and,
b) at a time of pen testing,
 b1) moving a pen to be tested to the drawing station,
 b2) placing the pen in drawing contact with the web,
 b3) producing relative movement between the pen and the web,
 b4) activating the motor to move the web from the drawing station to the sensing station,
 b5) at the sensing station sensing for the presence of a line on the web; and,
 b6) outputting a pen operative signal if a line is detected on the web at the sensing station and for outputting a pen inoperative signal if a line is not detected on the web at the sensing station.

11. The method of claim 10 and further comprising the steps of:

a) starting the motor to move the web from the drawing station to the sensing station;
b) stopping the motor and outputting a pen operative signal as soon as a line is detected on the web; and,
c) stopping the motor and outputting a pen inoperative signal if a line is not detected on the web within a pre-established time after the motor is started.

12. The method of claim 10 and further comprising the steps of:

a) connecting the web between a supply roller and a take-up roller; and,
b) connecting the motor to drive the take-up roller and pull the web from the supply roller.

13. The method of claim 10 and further comprising the steps of:

providing an optical sensor at the sensing station.

14. The method of claim 13 and further comprising the steps of:

using the optical sensor to provide an indication of detected line quality as produced by the pen on the web.

15. The method of claim 13 and further comprising the steps of:

using the optical sensor to provide an indication of detected line width as produced by the pen on the web.

16. The method of claim 10 wherein said step of producing relative movement between the pen and the web comprises:

moving the pen over the web.

17. The method of claim 10 wherein said step of producing relative movement between the pen and the web comprises:

moving the pen laterally across the web.

18. In a vector plotter employing a pen for plotting lines on a plotting medium moving over a platen at a plotting station, pen testing apparatus for checking the operational status of a pen operationally held by the vector plotter comprising:

a) a web separate from the plotting medium and displaced from the plotting station, said web being connected between a supply roller and a take-up roller;
b) a motor connected to said take-up roller to move said web between a drawing station and a sensing station;
c) means for moving a pen to be tested to said drawing station and for placing said pen in drawing contact with said web;
d) means for moving said pen across said web;
e) first logic means for activating said motor to move said web from said drawing station to said sensing station;
f) optical sensing means at said sensing station for sensing the presence of a line on said web; and,
g) second logic means for outputting a pen operative signal if a line is detected on said web by said optical sensing means at said sensing station and for outputting a pen inoperative signal if a line is not detected on said web by said optical sensing means at said sensing station.

19. The apparatus for checking the operational status of a pen operationally held in a vector plotter of claim 18 wherein:

said first logic means and said second logic means cooperate to provide means for starting said motor to move said web from said drawing station to said sensing station, for stopping said motor and outputting a pen operative signal as soon as a line is detected on said web by said optical sensing means, and for stopping said motor and outputting a pen inoperative signal if a line is not detected on said web by said optical sensing means within a pre-established time after said motor is started.

20. The apparatus for checking the operational status of a pen operationally held in a vector plotter of claim 18 wherein:

said optical sensing means, said first logic means, and said second logic means cooperate to provide an indication of detected line quality as produced by said pen on said web.

21. The apparatus for checking the operational status of a pen operationally held in a vector plotter of claim 18 wherein:

said optical sensing means, said first logic means, and said second logic means cooperate to provide an indication of detected line width as produced by said pen on said web.

22. The apparatus for checking the operational status of a pen operationally held in a vector plotter of claim 18 wherein:
said drawing station comprises a lateral extension of the platen.

* * * * *